United States Patent [19]
Bloch

[11] 3,799,996
[45] Mar. 26, 1974

[54] PREPARATION OF TETRAFLUOROETHYLENE

[75] Inventor: Herman S. Bloch, Skokie, Ill.

[73] Assignee: Universal Oil Products Company, Des Plaines, Ill.

[22] Filed: Aug. 4, 1971

[21] Appl. No.: 169,046

[52] U.S. Cl. .............................. 260/653.3, 252/443
[51] Int. Cl. ........................ C07c 17/26, C07c 21/18
[58] Field of Search ................................ 260/653.3

[56] References Cited
UNITED STATES PATENTS

| | | | |
|---|---|---|---|
| 2,925,446 | 2/1960 | Drysdale | 260/653.3 |
| 3,016,405 | 1/1962 | Lovejoy | 260/653.3 |

*Primary Examiner*—Daniel D. Horwitz
*Attorney, Agent, or Firm*—James R. Hoatson, Jr.; Raymond H. Nelson

[57] ABSTRACT

Tetrahalo-substituted ethylenes, and particularly tetrafluoroethylene, may be prepared by reacting a mixed tetrahalomethane with a metal carbonyl in the presence of an inert solvent. The tetrafluoroethylene which is prepared is useful as a starting material for the preparation of polymeric substances.

9 Claims, No Drawings

PREPARATION OF TETRAFLUOROETHYLENE

This invention relates to a process for preparing tetrahaloethylenes. More specifically, the invention is concerned with a process for preparing tetrafluoroethylene by utilizing a mixed tetrahalomethane as the starting material, said methane containing two fluoro atoms as well as two halo substituents of a dissimilar nature.

Tetrahalo-substituted ethylenes, and more specifically, tetrafluoroethylene may be utilized as starting materials in the preparation of homo- polymeric substances and of copolymers. A specific example of this is the preparation of polymers known in the trade as Teflon. The resultant polymers will find a wide variety of uses in commercial applications. For example, the polymer may be prepared as a thin coating for cooking utensils such as frying pans or pots whereby the problem of food adhering to the surface of the cooking utensil is eliminated. In addition, the tetrafluoroethylene which may be in the form of a polymer, plastic, or resin, is available as resin powder or may be formed into sheets, rods, tape, and as an aqueous dispersion or film. The various forms of the polymeric material, in addition to its use as a coating for cooking utensils where stickiness must be avoided, may also be used as gaskets, seals, components for electrical insulation, linings for drums and containers, valve seats, bearings and packings, as a spacer for coaxial cables, laminates, diaphragms, molder parts of pumps and fittings, tubes or hoses, etc. The various uses of polytetrafluoroethylene stem from the physical properties of the polymer such as its being nonflammable as well as highly resistant to oxidation and the action of chemicals which include strong acids, alkalis, and oxidizing agents.

It is therefore an object of this invention to provide a novel process for preparing tetrafluoroethylene by utilizing a tetrahalo-substituted methane as the starting material.

In one aspect an embodiment of this invention is found in a process for the preparation of tetrafluoroethylene which comprises reacting a dihalodifluoromethane with a metal carbonyl at reaction conditions, and recovering the resultant tetrafluoroethylene.

A specific embodiment of this invention is found in a process for the preparation of tetrafluoroethylene which comprises reacting dichlorodifluoromethane with cobalt carbonyl at a temperature in the range of from about 20° to about 100° C. and a pressure in a range of from about atmospheric to about 100 atmospheres in the presence of ethyl ether, and recovering the resultant tetrafluoroethylene.

Other objects and embodiments will be found in the following further detailed description of the present invention.

As hereinbefore set forth, the present invention is concerned with a process for preparing a tetrahalo-substituted ethylene in which the halogen substituents are identical in nature. The process is effected by treating a tetrahalo-substituted methane which possesses the generic formula:

in which X is a halogen other than fluorine and preferably chlorine or bromine, for example, dichlorodifluoromethane, dibromodifluoromethane, diiododifluoromethane, said compounds having been formed by any means known in the art. In the present process these compounds are treated with a metal carbonyl compound under reaction conditions hereinafter set forth in greater detail. The metal carbonyls which are used to treat the aforementioned dihalodifluoromethane preferably comprise carbonyls of metals of Group VIII of the Periodic Table and specifically cobalt carbonyl, nickel carbonyl, and iron carbonyl. The reaction conditions which are utilized to prepare the desired tetrafluoroethylene include reaction temperatures ranging from subambient, that is, from about 10° C., up to about 100° C. or more. In addition, it is also contemplated that the process of this invention may be effected by utilizing pressures in the range of from about atmospheric up to about 100 atmospheres or more. When superatmospheric pressures are employed, the pressures are afforded by the introduction of an inert gas such as nitrogen into the reaction zone. In addition, it is also contemplated that the reaction is effected in the presence of an inert organic solvent. Solvents which may be employed will include dimethyl ether, diethyl ether, dipropyl ether, diisopropyl ether, methyl alcohol, ethyl alcohol, propyl alcohol, isopropyl alcohol, etc., dioxane, tetrahydrofuran and the like.

The process of this invention may be effected in any suitable manner and may comprise either a batch or continuous type operation. For example, when a batch type operation is used, the quantity of the metal carbonyl such as cobalt carbonyl along with the predetermined inert solvent is placed in an appropriate apparatus such as an autoclave of the rotating or mixing type. Following this, the dihalodifluoromethane such as dichlorodifluoromethane is charged to the reactor which is thereafter heated or cooled to the desired operating temperature. In addition, if an additional pressure is desired, nitrogen is pressed in until the desired operating pressure is reached. Following this, the autoclave is maintained at the desired operating conditions of temperature and pressure for a predetermined period of time which may range from about 0.5 up to about 10 hours or more in duration. At the end of this time, the maintenance of the autoclave at subambient or elevated temperatures is dicontinued and the apparatus is allowed to return to room temperature. Any excess pressure which may still be present is discharged and the apparatus is opened. The reaction mixture is recovered and subjected to conventional means of separation which include filtration, washing, drying, extraction, fractional distillation, etc., whereby the desired tetrafluoroethylene is recovered and removed to storage.

It is also contemplated within the scope of this invention that the process may be effected in a continuous type of operation. When this type of operation is used, the dichlorodifluoromethane is continuously charged to a reaction zone which is maintained at the proper operating conditions of temperature and pressure, said reaction zone containing the desired metal carbonyl of the type hereinbefore set forth in greater detail. If so desired, the solvent in which the reaction is effected may be charged to the reaction vessel through a separate line or the dihalodifluoromethane may be admixed with the solvent and the combination charged thereto in a single stream. Upon completion of the desired residence time, reactor effluent is continuously withdrawn and the gas phase comprising the tetrafluoroethylene is separated from any solvent and metal carbonyl, the latter two being recycled to the reaction zone while the desired product is recovered and removed to storage.

The following examples are given to illustrate the process of the present invention which, however, are not intended to limit the generally broad scope of the present invention in strict accordance therewith.

EXAMPLE I

In this example, 15 g. of cobalt carbonyl along with 100 cc. of diethyl ether are placed in the glass liner of a rotating autoclave. The liner is sealed into the autoclave and 0.2 mols of dichlorodifluoromethane are charged to the autoclave. The autoclave is then heated to a temperature of 50° C. and maintained thereat for a period of about 4 hours. At the end of this time heating is discontinued and the autoclave and contents thereof are allowed to cool to room temperature. The reaction mixture is recovered and the gas phase is separated from the liquid phase. The gas phase which comprises tetrafluoroethylene as well as unreacted dichlorodifluoromethane is water-washed, dried and fractionated at low temperatures to recover tetrafluoroethylene, which is removed to storage.

EXAMPLE II

A mixture of 13 g. of nickel carbonyl and 100 cc. of dioxane is placed in the glass liner of a rotating autoclave which is thereafter sealed into the autoclave. Following this, dibromodifluoromethane is charged thereto until 0.2 mol of material has entered the reactor. The autoclave is then cooled to a temperature of 20° C. by means of an ice bath and maintained thereat for a period of about 10 hours. At the end of this time, the autoclave and contents are allowed to return to room temperature and the reaction mixture is recovered therefrom. From the gas phase, which contains the desired tetrafluoroethylene, the latter is separated and recovered.

EXAMPLE III

In like manner 13 g. of nickel carbonyl and 100 cc. of diethyl ether are placed in the glass liner of a rotating autoclave. The liner is thereafter sealed into the autoclave and 0.2 mols of dichlorodifluoromethane is charged thereto. The autoclave is heated to a temperature of 70° C. and maintained thereat for a period of 6 hours. At the end of this time, the autoclave is allowed to return to room temperature. Upon opening the autoclave, the reaction product is recovered therefrom, the gas phase is separated from the liquid phase, and the desired product comprising tetrafluoroethylene is recovered from said gas phase.

I claim as my invention:

1. A process for the preparation of tetrafluoroethylene which comprises reacting a dihalodifluoromethane in which the halo substituent is chlorine, bromine or iodine with a carbonyl of a metal of Group VIII of the Periodic Table at a temperature in the range of from about 10° to about 100° C. and a pressure in the range of from about atmospheric to about 100 atmospheres.

2. The process as set forth in claim 1 wherein the reaction is effected in the presence of an inert solvent.

3. The process as set forth in claim 2 in which said inert solvent is diethyl ether.

4. The process as set forth in claim 2 in which said inert solvent is dioxan.

5. The process as set forth in claim 1 in which said metal carbonyl is cobalt carbonyl.

6. The process as set forth in claim 1 in which said metal carbonyl is iron carbonyl.

7. The process as set forth in claim 1 in which said metal carbonyl is nickel carbonyl.

8. The process as set forth in claim 1 in which said dihalodifluoromethane is dichlorodifluoromethane.

9. The process as set forth in claim 1 in which said dihalodifluoromethane is dibromodifluoromethane.

* * * * *